(12) United States Patent
Strobietto

(10) Patent No.: US 9,815,208 B2
(45) Date of Patent: Nov. 14, 2017

(54) DEVICE FOR CONNECTING A TOOL TO A ROBOT ARM

(71) Applicant: ROBOTOOLS S.R.L., Turin (IT)

(72) Inventor: Elio Strobietto, Turin (IT)

(73) Assignee: Robotools S.r.l., Turin (IT)

( * ) Notice: Subject to any disclaimer, the term of this patent is extended or adjusted under 35 U.S.C. 154(b) by 28 days.

(21) Appl. No.: 14/384,117

(22) PCT Filed: Mar. 7, 2013

(86) PCT No.: PCT/IB2013/051801
§ 371 (c)(1),
(2) Date: Sep. 9, 2014

(87) PCT Pub. No.: WO2013/132453
PCT Pub. Date: Sep. 12, 2013

(65) Prior Publication Data
US 2015/0043960 A1    Feb. 12, 2015

(30) Foreign Application Priority Data
Mar. 9, 2012    (IT) .............................. TO2012A0212

(51) Int. Cl.
*B25J 15/04* (2006.01)
*B23B 31/10* (2006.01)
*B23B 31/107* (2006.01)

(52) U.S. Cl.
CPC ....... *B25J 15/0416* (2013.01); *B23B 31/1071* (2013.01); *B25J 15/04* (2013.01); *Y10T 403/22* (2015.01)

(58) Field of Classification Search
CPC ........ B25J 9/144; B25J 15/04; B25J 15/0408; B25J 15/0416; B25J 19/063;

(Continued)

(56) References Cited

U.S. PATENT DOCUMENTS 4,643,632 A * 2/1987 Beyer .................... B25J 19/063
                                                        414/730
4,906,123 A * 3/1990 Weskamp ............ B23Q 1/0063
                                                        403/322.2

(Continued)

FOREIGN PATENT DOCUMENTS

DE    33 47 423    7/1985
EP    0 092 967    11/1983

(Continued)

OTHER PUBLICATIONS

International Search Report for PCT/IB2013/051801, dated Jun. 21, 2013.

(Continued)

*Primary Examiner* — Ryan Kwiecinski
(74) *Attorney, Agent, or Firm* — Nixon & Vanderhye P.C.

(57) ABSTRACT

A device for connecting a tool to an arm of a robot, comprising: —a body (2; 32) having an annular wall provided with openings (6; 36), received within which are one or more balls (8; 38), which are mobile within said openings between an inoperative position and an operative position, in said operative position said balls projecting from said wall to engage corresponding portions of said tool and clamping the latter on said arm; and —a piston (4; 34), configured for co-operating with said balls and governed fluid-dynamically between a first position and a second position, wherein, in said second position, —said piston forces said-balls into said operative position, and, in said first position, said piston releases said balls so that they can move into said inoperative position. The device is characterized in that it comprises safety means (15, 55, 65, 75), which, in an active condition thereof, engage said piston (4; 34) in said second position so as to block it in said second position in order to prevent displacement of said balls into said inoperative position.

5 Claims, 8 Drawing Sheets

(58) Field of Classification Search
CPC ............ Y10T 403/581; Y10T 403/583; Y10T 403/592; Y10T 403/593; Y10T 403/604; Y10T 403/22; B23B 31/1071; B23B 31/30; B23B 2270/22; B23Q 1/0063; Y10S 483/901; Y10S 483/902
USPC .................................................. 403/316, 317
See application file for complete search history.

(56) References Cited

U.S. PATENT DOCUMENTS

| | | | | |
|---|---|---|---|---|
| 4,954,005 | A * | 9/1990 | Knasel | B25J 19/063 403/116 |
| 5,211,501 | A * | 5/1993 | Nakamura | B25J 15/04 403/322.3 |
| 5,839,557 | A * | 11/1998 | McCormick | B25J 19/06 192/56.32 |
| 8,585,031 | B2 * | 11/2013 | Stark | B23Q 1/0072 269/309 |
| 2013/0330120 | A1 * | 12/2013 | Blanchard | F16B 21/165 403/322.2 |
| 2014/0270926 | A1 * | 9/2014 | Norton | F16D 41/086 403/322.2 |

FOREIGN PATENT DOCUMENTS

| | | | |
|---|---|---|---|
| EP | 0 139 758 | 5/1985 | |
| EP | 0 301 711 | 2/1989 | |
| EP | 1 215 018 | 6/2002 | |
| JP | EP 0092967 A2 * | 11/1983 | ............. B25J 15/04 |
| JP | WO 8403654 A1 * | 9/1984 | ........... B23Q 1/0018 |
| WO | WO 03101673 A2 * | 12/2003 | ............. B25J 15/04 |

OTHER PUBLICATIONS

Written Opinion of the International Search Authority for PCT/IB2013/051801, dated Jun. 21, 2013.

* cited by examiner

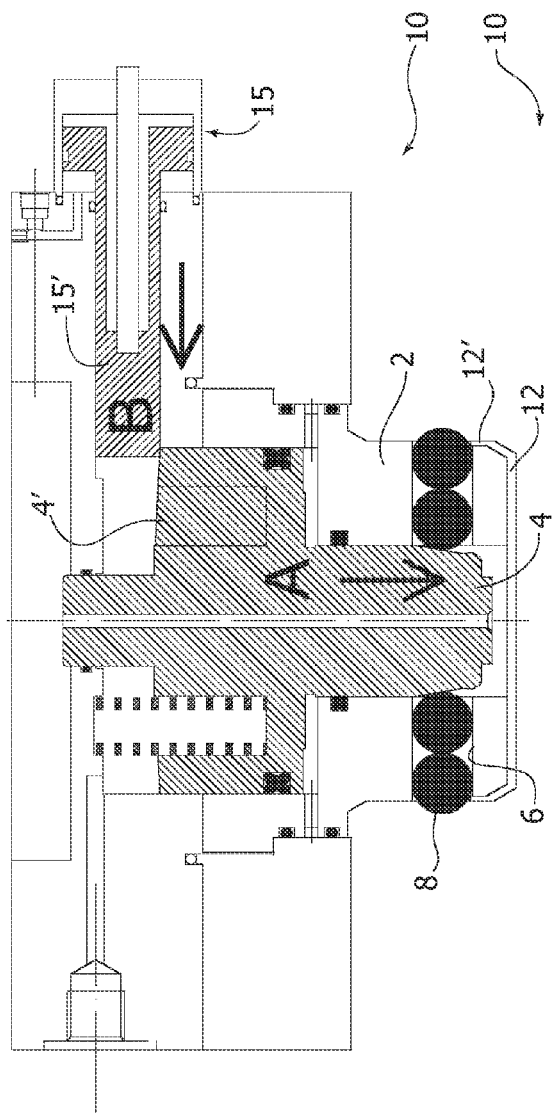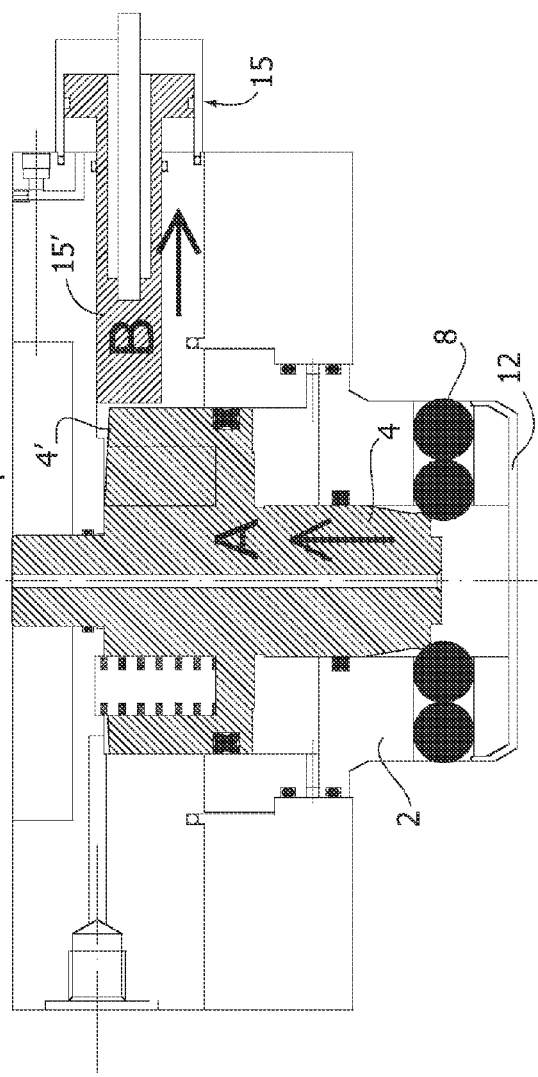

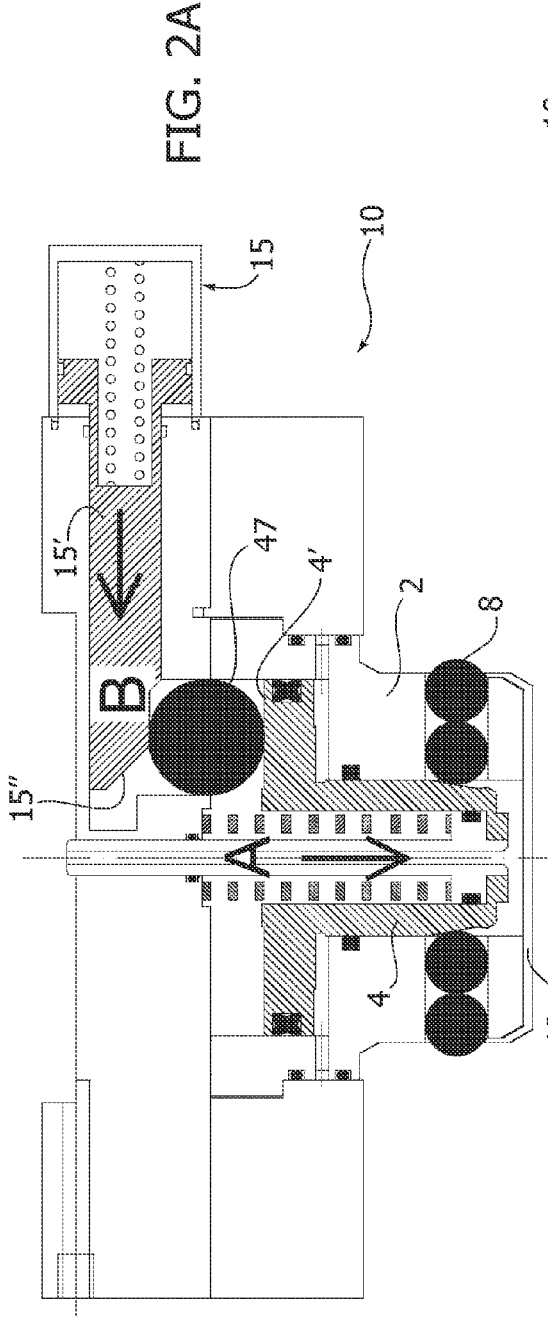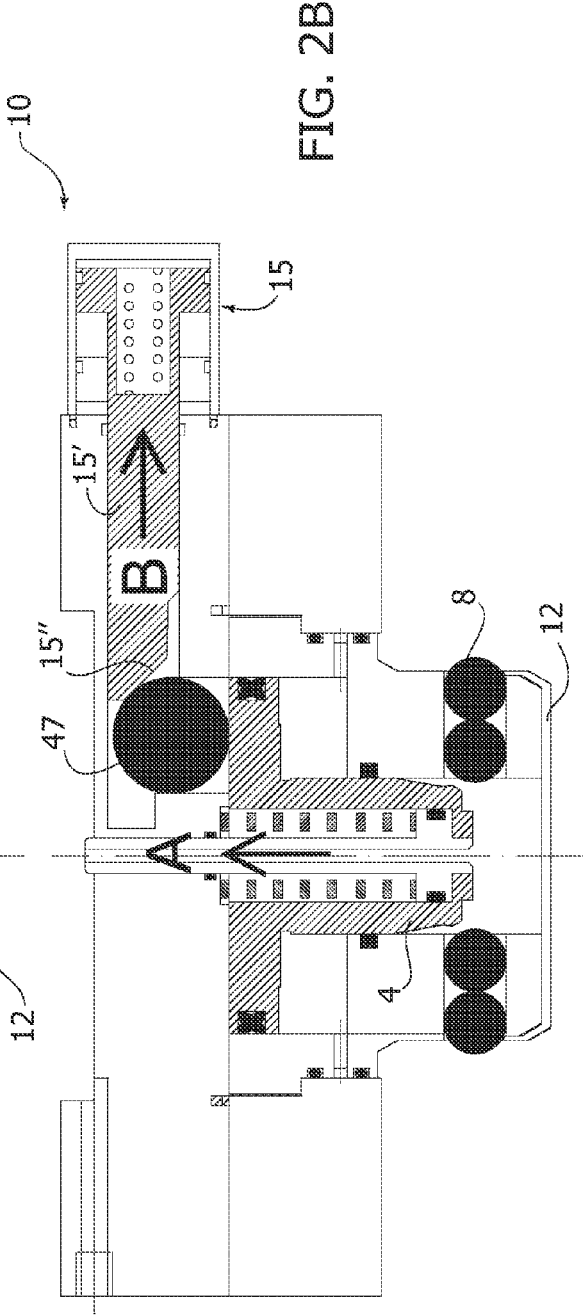

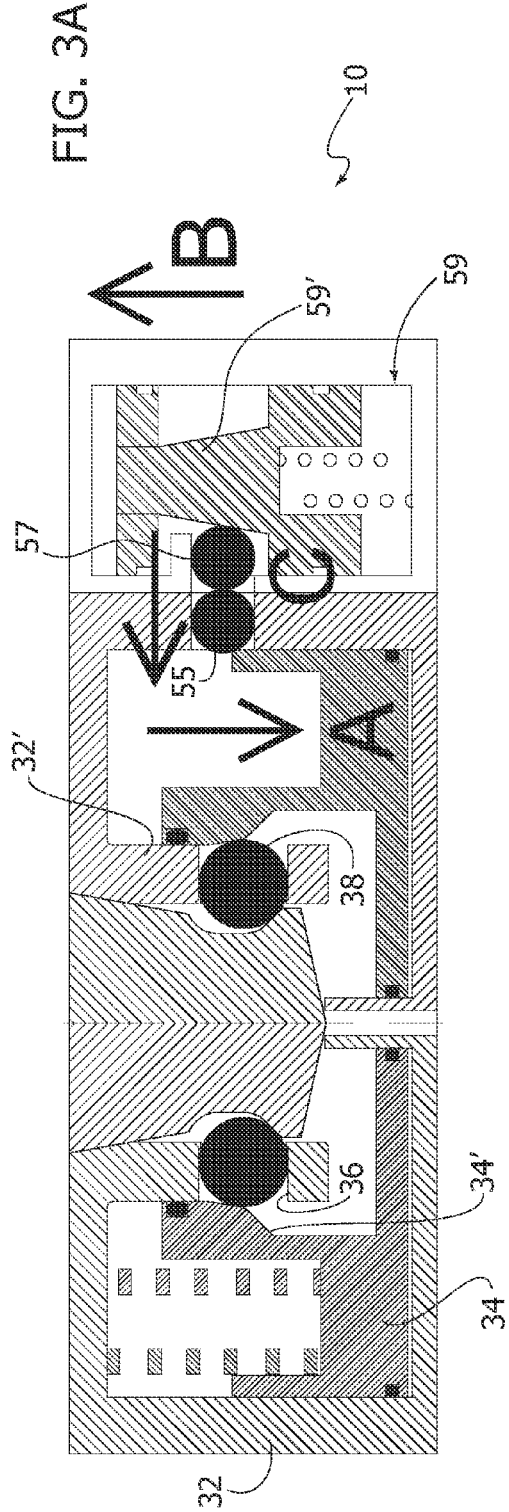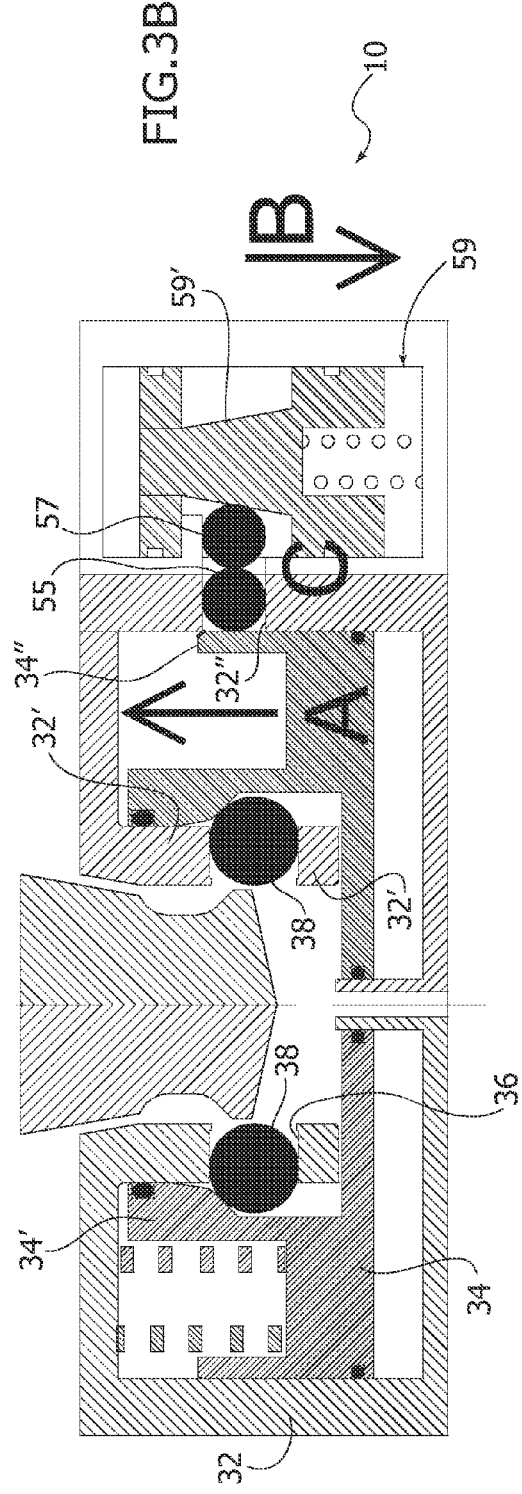

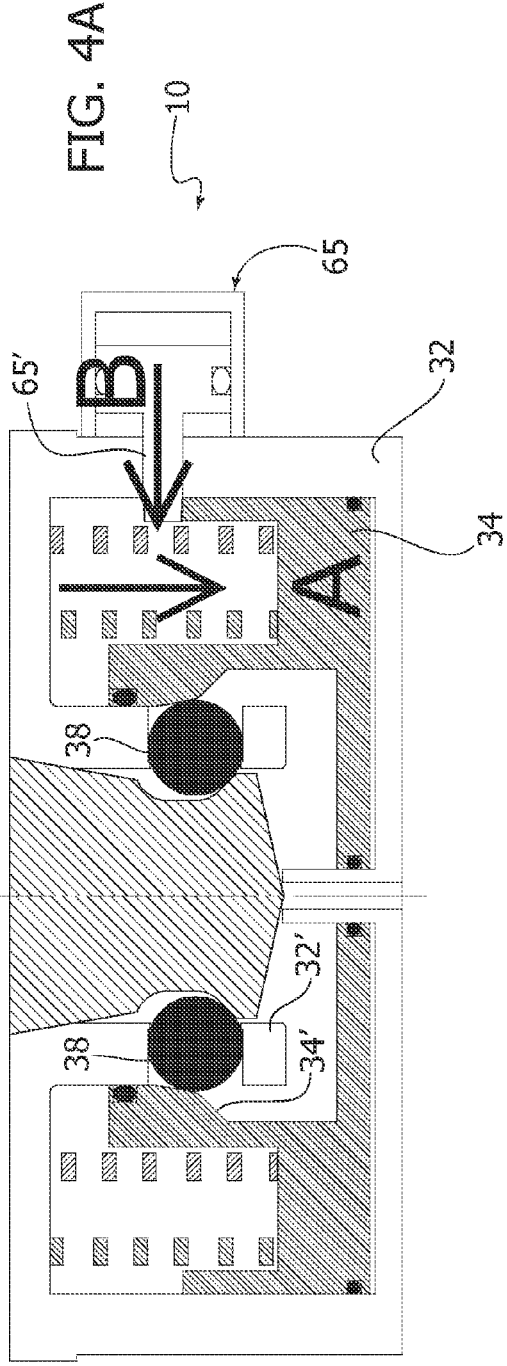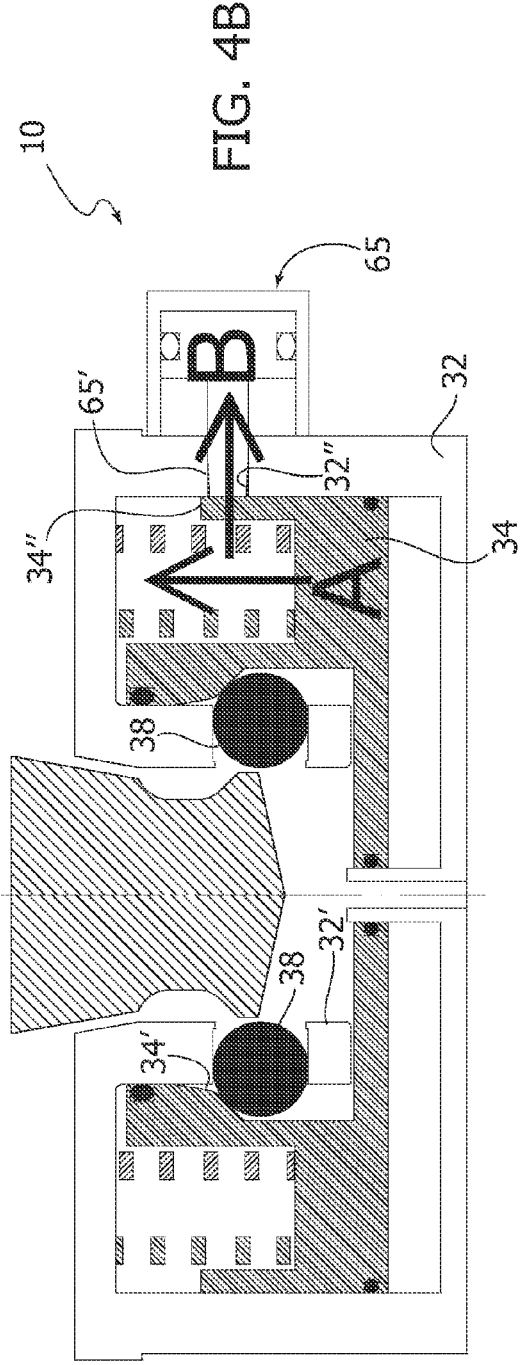

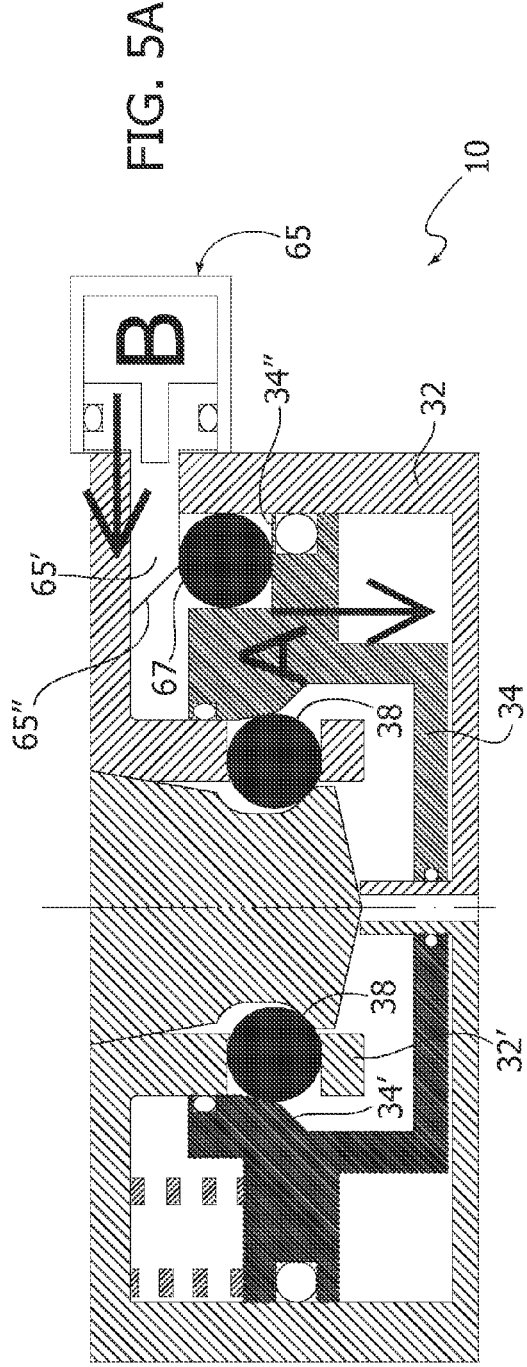
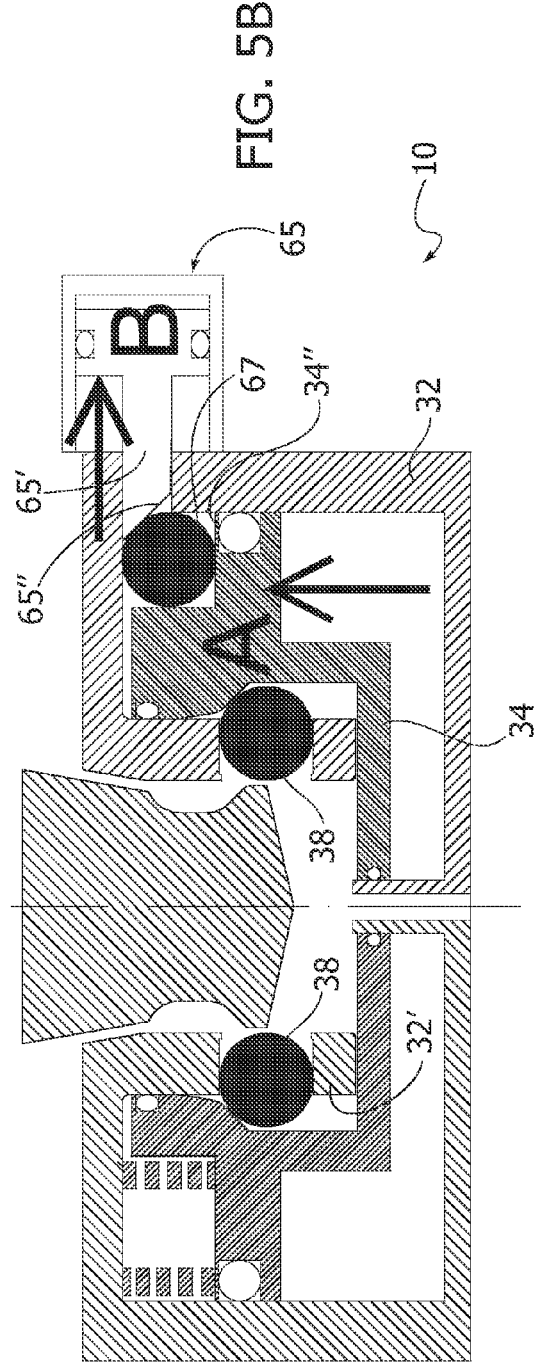

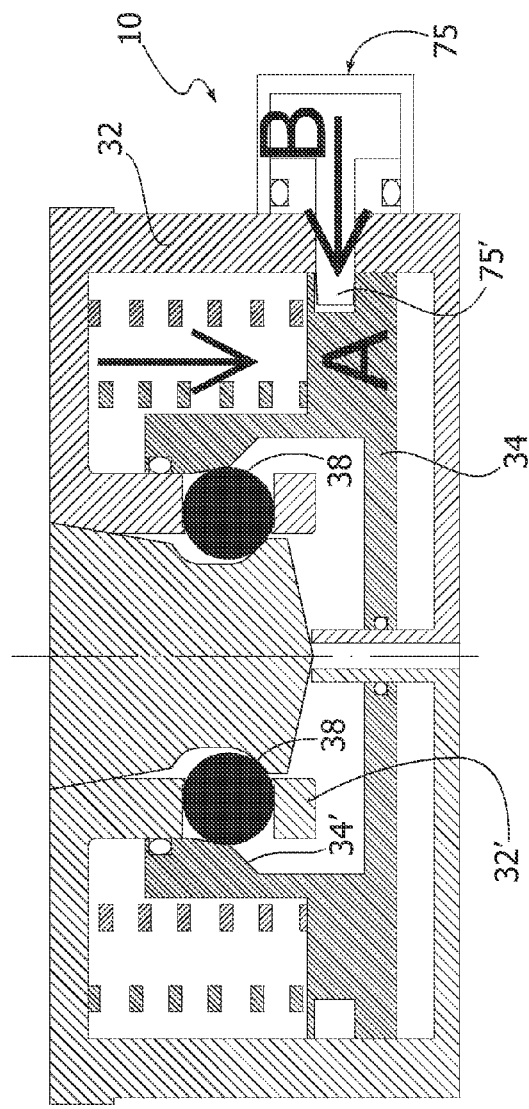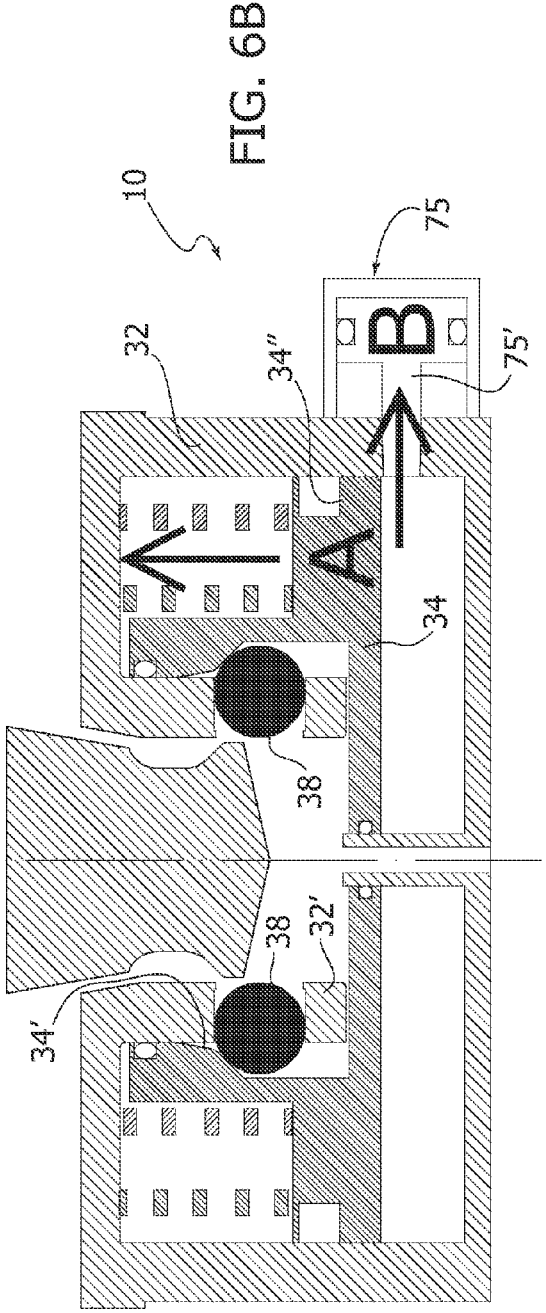

DEVICE FOR CONNECTING A TOOL TO A ROBOT ARM

This application is the U.S. national phase of International Application No. PCT/IB2013/051801 filed 7 Mar. 2013 which designated the U.S. and claims priority to Italian Application No. IT TO2012A000212 filed 9 Mar. 2012, the entire contents of each of which are hereby incorporated by reference.

The present invention relates to a device for connecting a tool to an arm of a robot, of the type comprising:

- a body having an annular wall provided with openings, received within which are one or more balls, which are mobile within the respective opening between an inoperative position and an operative position, in said operative position said balls projecting from said wall to engage corresponding portions of said tool and clamping the latter on said arm; and
- a piston, configured for co-operating with said balls and governed fluid-dynamically between a first position and a second position, where, in said second position, said piston forces said balls into said operative position, and, in said first position, said piston releases the balls so that they can move into their inoperative position.

The device referred to above forms the subject of the Italian patent No. 1321095.

The object of the present invention is to improve such a device, in particular rendering it more reliable and safer.

The object referred to above is achieved via a connection device having the characteristics disclosed below.

The claims form an integral part of the technical teaching provided herein in relation to the invention.

The invention will now be described, purely by way of non-limiting example, with reference to the annexed plates of drawings, in which:

FIGS. 1a and 1b are schematic illustrations of a first embodiment of the device described herein;

FIGS. 2a and 2b are schematic illustrations of a second embodiment of the device described herein;

FIGS. 3a and 3b are schematic illustrations of a third embodiment of the device described herein;

FIGS. 4a and 4b are schematic illustrations of a fourth embodiment of the device described herein;

FIGS. 5a and 5b are schematic illustrations of a fifth embodiment of the device described herein;

FIGS. 6a and 6b are schematic illustrations of a sixth embodiment of the device described herein;

Figure 8D:
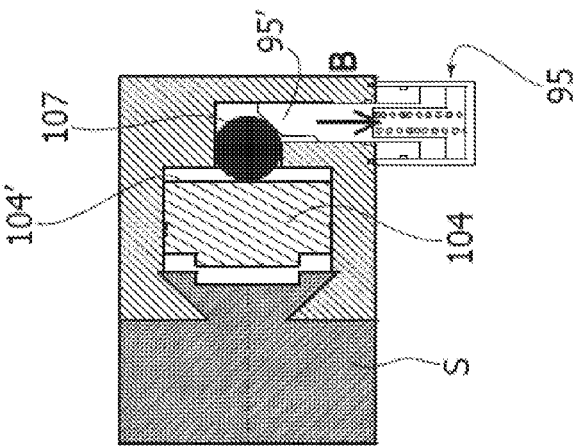
Figure 8C:
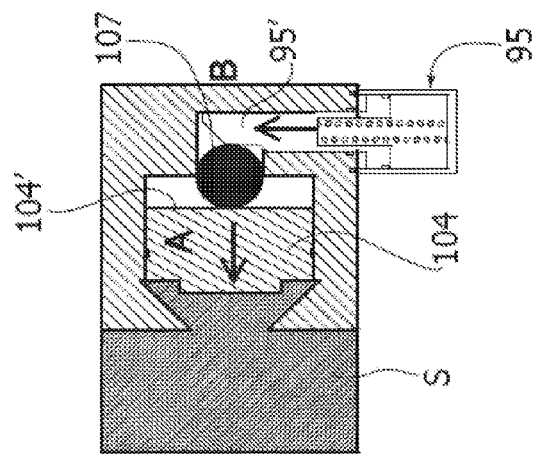
Figure 8B:
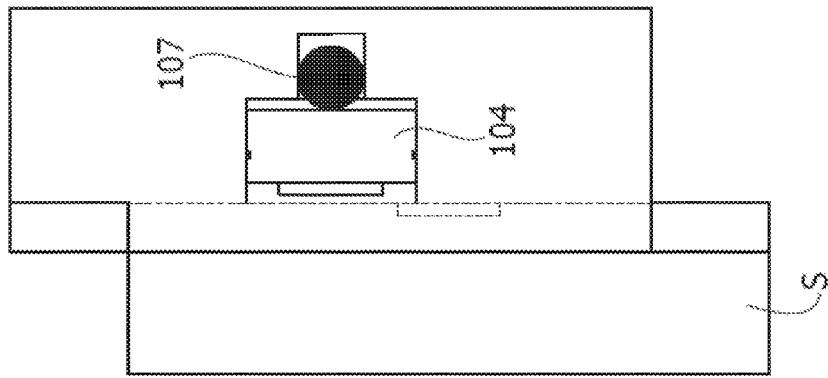
Figure 8A:
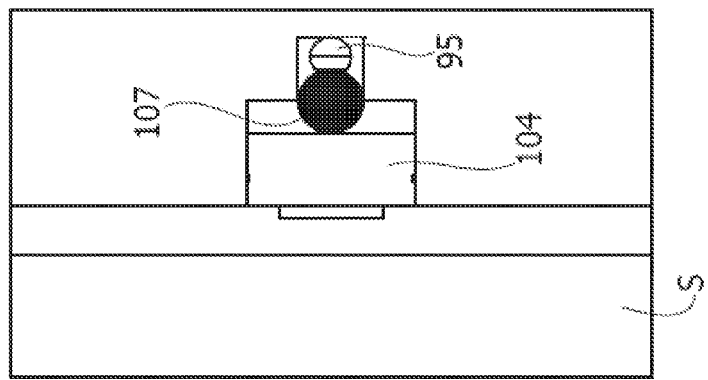

FIGS. 8A, 8B, 8C, an 8D are schematic illustrations of safety means according to the present invention used in a further type of connection device.

In the ensuing description, various specific details are illustrated aimed at providing an in-depth understanding of the embodiments. The embodiments may be implemented without one or more of the specific details, or with other methods, components, or materials, etc. In other cases, known structures, materials, or operations are not illustrated or described in detail so that various aspects of the embodiment will not be obscured.

The references used herein are provided merely for convenience and hence do not define the sphere of protection or the scope of the embodiments.

With reference to the figures, designated by the reference number 10 is a device for connecting a tool, for example a welding head, to an arm of a robot. In general, the aforesaid device comprises a body having an annular wall provided with through openings, received within which are one or more balls. The balls are mobile along the respective opening between an inoperative position and an operative position, in which the balls project from the annular wall to engage corresponding portions of the tool and clamp the latter on the arm of the robot. The device further comprises a piston configured for co-operating with the aforesaid balls and governed fluid-dynamically between a first position and a second position, wherein, in the second position, the piston forces the aforesaid balls into the operative position, and, in the first position, the piston releases the balls so that they can move into their inoperative position.

In various embodiments, as in the ones illustrated in FIGS. 1 and 2, the annular wall is defined by an annular cylindrical body 2, within which the piston 4 slides. The cylindrical body has radial through holes 6, which extend from the outer side of the aforesaid body and give out on the inner side. In various embodiments, as in the ones illustrated in FIGS. 1 and 2, housed within each radial hole are two balls 8, in mutual direct contact and mobile within the radial holes between an inoperative position, where they are within the outer side of the body (see FIGS. 1b and 2b), and an operative position (see FIGS. 1a and 2a), where the ball that is closer to the outer side projects therefrom.

The piston 4 has a shaped end designed to co-operate with the aforesaid balls. In particular, in the movement of the piston from its first position to the second position, the end pushes the balls into their operative position and, in the second position of the piston, forces them into the operative position. In various embodiments, as in the ones illustrated in FIGS. 1 and 2, the cylindrical body is closed at the bottom by a circular plate 12, having a raised border 12' that sets itself at the bottom regions of the radial holes so as to define an edge of arrest designed to prevent exit of the balls from the respective holes.

In various embodiments, as in the ones illustrated in FIGS. 3 to 6, the annular wall that carries the clamping balls is instead defined by a hollow cylindrical body 32, having at the centre the annular wall 32'. In this case, the annular wall defines a central mouth for connection of the tool. The aforesaid wall has radial through holes 36, within which the balls 38 are housed and which extend from the inner side of the annular wall as far as its outer side, with a cross section decreasing towards the inner side so as to prevent exit of the balls. In various embodiments, as in the ones illustrated in FIGS. 3 to 6, mounted within the body is the piston 34, which has a substantially cup-shaped central portion. This central portion surrounds the wall 32' and has at its distal end edge a cam profile 34' designed to engage the balls 38. The balls 38 are mobile within the respective hole between the inoperative position (see FIGS. 3B, 4B, 5B, 6B), where they are inside the body and out of the central mouth, and the operative position (see FIGS. 3A, 4A, 5A, 6A), where they project within the mouth. The piston 34 is axially mobile within the cylindrical body between the first position (see FIGS. 3B, 4B, 5B, 6B) and the second position (see FIG. 3A, 4A, 5A, 6A). In the movement of the piston from its first position to the second position, the cam portion 34' pushes the balls into their operative position and, in the second position of the piston, forces them into this position.

The piston 4 or 34 is operated fluid-dynamically via appropriate means that comprise two sealed chambers, which are delimited, at least partially, by a surface of the piston, and are variable in volume as a function of the pressure of the working fluid contained therein, in order to bring about displacement of the piston from the first position to the second position, and vice versa. The above control means are not in any case described herein in detail in so far as they can be of any type conventionally used in the robotics field.

In general, the device described herein is characterized in that it comprises safety means, which, in an active condition thereof, engage the piston 4 or 34 when it is in its second position, in order to block it in this position so as to prevent displacement of the balls towards the inoperative position.

In this connection, it should be noted that any possible malfunctioning of the control means of the piston, or interruption of operation of the aforesaid means, can in fact cause pressure losses in the working fluid, these losses no longer enabling the piston to counteract the forces exerted on the balls by the tool, this causing the tool to drop as a result of displacement of the balls themselves. This possibility, in addition to causing damage to the tool and to the surrounding equipment, constitutes an evident danger for the operators that are in the working area of the robot. The safety means of the clamping device described herein prevent, instead, this possibility from arising, consequently rendering the device safer and more reliable.

In general, in various embodiments, as in the ones illustrated, the piston has a contrast surface facing in the direction of displacement of the piston from the second position to the first position, and the aforesaid safety means, in their active condition, act as arrest for the aforesaid contrast surface. In various embodiments, as in the ones illustrated, the above safety means comprise a blocking member, designed to engage the contrast surface, which is mobile in a direction transverse to the direction of displacement of the aforesaid piston. The portions of mutual contact of the contrast surface and of the blocking member must be such as to prevent reversibility of the motion of the piston into the first position; at least one of the contact surfaces must consequently be in a plane substantially orthogonal to the direction of displacement of the piston.

Hereinafter, various embodiments of the aforesaid safety means will be described. Elements that are common to the various embodiments, or in any case substantially resemble one another, will be designated by the same reference numbers.

In various embodiments, as in the one illustrated in FIG. 1, the blocking member is defined by the stem 15' of a linear actuator 15, which is mobile in a direction transverse to the direction of movement of the piston 4, between an inoperative retracted position, where the stem 15' cannot interfere with the movement of the piston, and an operative extracted position, where the stem engages the contrast surface 4' when the piston is in its second position in such a way as to prevent any movement thereof towards the first position.

In various embodiments, as in the one illustrated in FIGS. 2A and 2B, the blocking member is once again defined by the stem of a linear actuator 15, which, however, does not act on the piston 4 directly, but via a ball 47 carried by the contrast surface 4' of the piston. The above actuator is configured in such a way that, when the piston is in the second position, and the stem 15' is in the extracted position, the aforesaid stem engages the ball carried by the piston with a contrast surface that prevents any movement of the piston towards its first position. In its retracted position, the stem releases the ball from the above engaged condition, thus enabling the piston to move into the first position. In various preferred embodiments, as in the one illustrated in FIGS. 2A and 2B, when the piston 4 is in its first position and the stem is in its retracted position, the latter is in any case in contact with the ball 47, via a ramp-like surface 15" defined on the end of the stem itself; this configuration enables the ball and the stem always to be kept in contact, thus guaranteeing an immediate action of blocking by the stem when the piston moves into its second position.

In various embodiments, as in the one illustrated in FIGS. 3A and 3B, the blocking member is defined by a ball 55 carried by an outer wall of the body 32. In particular, the ball is set in a through hole 32", which is made in the above wall and gives out into the body, in a position corresponding to the piston 34. The ball 55 is mobile along the axis of the hole between an inoperative position, in which the ball is inside the hole and cannot interfere with the movement of the piston, and an operative position, where the ball projects into the internal space of the body and engages a contrast edge or surface 34" of the piston, when this is in the second position, so as to prevent any displacement thereof towards the first position.

The ball 55 is governed in its operative position within the body 32 by a linear actuator 59, specifically a cylinder, acting on a second ball 57. The second ball is in mutual direct contact with the first ball 55 and slides along with it along the axis of the hole 32". The actuator comprises a piston 59', which is mobile between a first position and a second position such as to engage the second ball 57 so that, during displacement of the piston from the first position to the second position, the first ball 55 is brought into its operative position and is forced into this position by the piston, via the second ball 57. In various embodiments, as in the one illustrated, the balls 55 and 57 are withheld between the piston 59' and the piston 34.

In the example illustrated in the figures, the actuator is set so that the piston 59' is mobile in a direction parallel to the direction of movement of the piston 34, but it is clear that it is possible to envisage alternative embodiments, in which the piston 59' is mobile in a direction transverse to the above direction.

In various embodiments, as in the one illustrated in FIGS. 4A and 4B, the blocking member is constituted by the stem 65' of a linear actuator 65. The stem 65' is able to slide within a hole 32" that traverses the outer side wall of the body 32, between a retracted inoperative position, where the stem 65' cannot interfere with the movement of the piston 34, and an extracted blocking position, where the stem projects into the body and engages a contrast surface 34" of the piston, when the latter is in its second position, so as to block any movement thereof towards its first position.

In various embodiments, as in the one illustrated in FIGS. 5A and 5B, the blocking member is defined once again by the stem 65' of a linear actuator 65, which, however, does not act upon the piston 34 directly, but via a ball 67 set on the contrast surface of the piston 34". This actuator is configured in such a way that, when the piston is in the second position and the stem of the actuator is in the extracted position, the aforesaid stem engages the ball 67, carried by the piston, with a contrast surface that prevents any movement of the piston towards its first position. In its retracted position, the stem 65' releases the ball from the aforesaid engaged condition, thus enabling the piston to move into its first position. In various preferred embodiments, as in the one illustrated in FIGS. 5A and 5B, when the piston 34 is in its first position and the stem 65' is in its retracted position, the latter is in any case in contact with the ball 67, via a ramp-like surface 65" defined on the end of the stem itself. This configuration enables the ball and the stem always to be kept in contact, thus guaranteeing an immediate action of blocking by the stem when the piston moves into its second position.

In various embodiments, as in the one illustrated in FIGS. 6A and 6B, the blocking member is defined by the stem 75' of a linear actuator 75. The stem 75' is inserted into a through hole 32 made in the outer side wall of the body 32, and is mobile, within the aforesaid hole, between a retracted position (illustrated in FIG. 6B), where the stem cannot interfere with the movement of the piston, and an extracted position (illustrated in FIG. 6A), where the stem engages the contrast surface or edge 34" of a cavity made in the piston when the latter is in its second position so as to prevent any movement thereof towards its first position. When the stem returns into its retracted position, the piston is once again free to move and go into its first position.

Figure 7B:
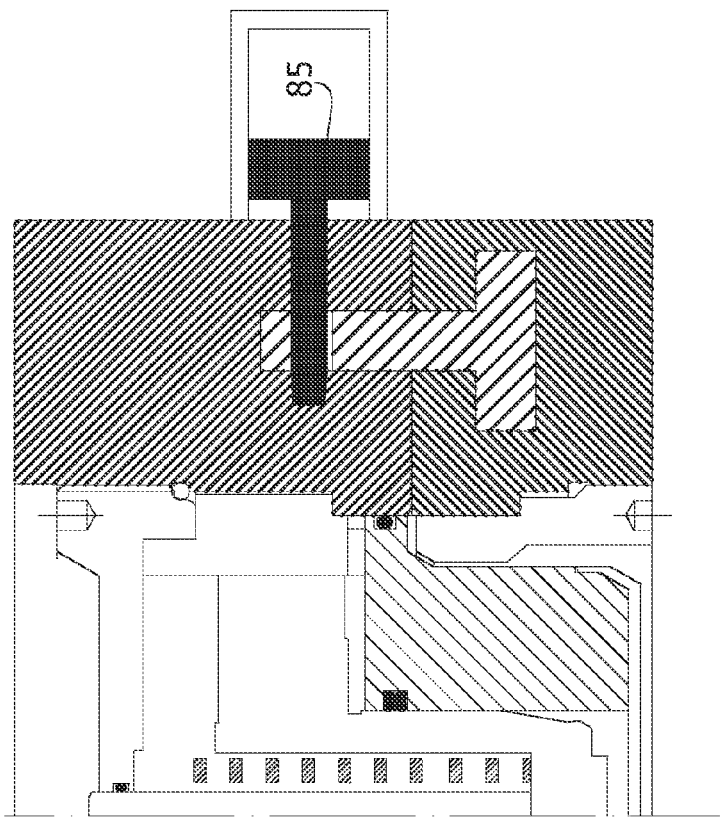
FIGS. 7a and 7b are schematic illustrations of a seventh embodiment of the clamping device described herein.
Figure 7A:
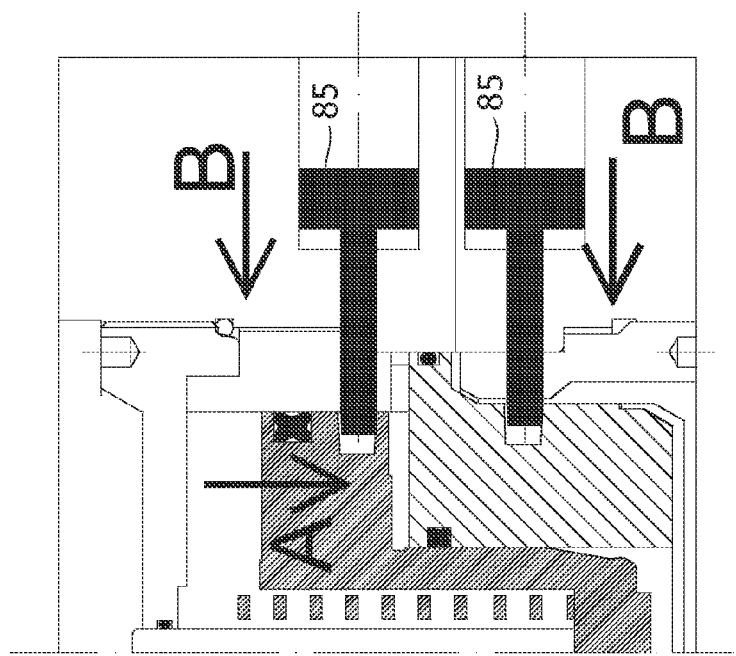

FIGS. 7A and 7B regard two solutions in which safety means comprising one or more linear actuators 85 are used in a connection device similar to the ones described above with reference to FIGS. 1 and 2.

FIGS. 8A and 8B illustrate use of safety means of the type referred to above, in a tool-clamping device provided with a slide-type movement system. The device comprises a linear actuator provided with a piston 104, which is mobile between an operative position, where the piston engages a corresponding portion of a tool-holder slide S, blocking it in position, and an inoperative position, where the piston does not interfere with the movement of the slide. The safety means comprise a linear actuator 95 having a stem 95', which is mobile between a retracted position and an extracted position, in a direction transverse to the direction of movement of the piston. In its extracted position, the stem 95' is designed to block the piston in its operative position via a ball 107 that is set on the contrast surface 104' of the piston. In particular, when the piston 104 is in its operative position, and the stem is in its extracted position, a contrast surface of the aforesaid stem engages the ball, thus preventing any movement of the piston towards the inoperative position. When the stem returns into its retracted position, the piston is released from the ball 107 and can move into its inoperative position, thus freeing the slide. In various preferred embodiments, as in the one illustrated in FIGS. 8A and 8B, when the piston is in its first position and the stem is in its retracted position, the latter is in any case in contact with the ball, via a ramp-like surface defined on the end of the stem itself. This configuration enables the ball and the stem always to be kept in contact, thus guaranteeing an immediate action of blocking by the stem when the piston moves into its second position.

Of course, without prejudice to the principle of the invention, the details of construction and the embodiments may vary, even significantly, with respect to what has been illustrated herein, purely by way of non-limiting example, without thereby departing from the scope of the invention, as defined by the annexed claims. In this connection, the embodiments illustrated above only present a few examples of actuators that can be used in the connection device described herein. In general, it is in any case possible to use any type of linear actuator suited to the purposes outlined above, for example, a pneumatic cylinder, a hydraulic cylinder, an electromechanical actuator, etc. In preferred embodiments, the above actuator envisages elastic means that govern the operative condition of blocking thereof so as to guarantee that connection of the tool is maintained even in the event of interruption of the electric power supply.

The invention claimed is:

1. A device for connecting a tool to an arm of a robot, the device comprises:
    a body having an annular wall provided with openings, received within which are one or more balls, which are mobile within said openings between an inoperative position and an operative position, in said operative position said balls projecting from said wall to engage corresponding portions of said tool and clamp the latter on said arm;
    a piston configured for co-operating with said balls and governed fluid-dynamically between a first position and a second position, wherein, in said second position, said piston forces said balls into said operative position, and, in said first position, said piston releases said balls so as to allow them to move into said inoperative position;
    wherein said device comprises safety means, which, in an active condition thereof, engage said piston in said second position so as to block said piston in said second position in order to prevent displacement of said balls into said inoperative position,
    wherein said piston has a contrast surface facing in the direction of displacement of said piston from said second position to said first position, and wherein, in said active condition, said safety means contacts and prevents the contrast surface from moving toward said first position,
    wherein said safety means comprise a blocking member designed to engage said contrast surface, which is mobile in a direction transverse to the direction of displacement of the aforesaid piston.

2. The device according to claim 1, wherein said blocking member is defined by the stem of a linear actuator, said stem engaging said contrast surface directly or else via a ball set on said contrast surface.

3. The device according to claim 1, wherein said blocking member is defined by a ball governed by a linear actuator.

4. The device according to claim 3, wherein the mobile element of said actuator can be moved in a direction transverse to the direction of movement of said ball and engages said ball via a cam portion.

5. The device according to claim 1, wherein said annular wall is defined by a hollow cylindrical body having at the centre said annular wall, said annular wall defining a central mouth for connecting the tool, and wherein said piston is mounted inside said body and has a substantially cup-shaped central portion that surrounds said annular wall and engages said balls, in said operative condition said balls projecting within said central mouth.

* * * * *